United States Patent
Sakai

(10) Patent No.: US 10,461,871 B2
(45) Date of Patent: Oct. 29, 2019

(54) MANAGEMENT APPARATUS AND INFORMATION PROCESSING SYSTEM

(71) Applicant: FUJITSU LIMITED, Kawasaki-shi, Kanagawa (JP)

(72) Inventor: Atsushi Sakai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 246 days.

(21) Appl. No.: 15/599,792

(22) Filed: May 19, 2017

(65) Prior Publication Data
US 2017/0366285 A1  Dec. 21, 2017

(30) Foreign Application Priority Data
Jun. 16, 2016  (JP) .................................. 2016-119789

(51) Int. Cl.
| | |
|---|---|
| *H04H 60/15* | (2008.01) |
| *G06F 15/78* | (2006.01) |
| *H04W 88/02* | (2009.01) |
| *H04H 60/13* | (2008.01) |

(52) U.S. Cl.
CPC ......... *H04H 60/15* (2013.01); *G06F 15/7839* (2013.01); *H04H 60/13* (2013.01); *H04W 88/02* (2013.01); *Y02D 70/26* (2018.01)

(58) Field of Classification Search
CPC ........ H04H 60/13; H04H 60/15; H04W 88/02
See application file for complete search history.

(56) References Cited

U.S. PATENT DOCUMENTS

| | | | | |
|---|---|---|---|---|
| 6,212,521 B1* | 4/2001 | Minami | .............. | G06F 16/9014 707/613 |
| 9,146,699 B2* | 9/2015 | Hashimoto | ........ | G03G 15/5004 |
| 2003/0191975 A1* | 10/2003 | Kohara | ................. | G06F 1/3203 713/300 |
| 2010/0256828 A1* | 10/2010 | Wang | ..................... | G06Q 50/06 700/286 |
| 2012/0303740 A1* | 11/2012 | Ferris | ..................... | H04L 29/06 709/217 |

FOREIGN PATENT DOCUMENTS

| | | |
|---|---|---|
| JP | 2011-204056 | 10/2011 |
| JP | 2013-148967 | 8/2013 |

\* cited by examiner

*Primary Examiner* — Joe Chacko
(74) *Attorney, Agent, or Firm* — Staas & Halsey LLP

(57) ABSTRACT

A management apparatus includes a memory and a processor coupled to the memory. The processor is configured to broadcast an activation request to a plurality of information processing devices having a reception period during which the activation request is received. The reception period occurs in a predetermined cycle. The processor is configured to receive a confirmation response from first information processing devices among the plurality of information processing devices. The first information processing devices receive the activation request. The processor is configured to issue an activation instruction to a predetermined number of second information processing devices among the first information processing devices. The activation instruction instructs to activate the second information processing devices. The processor is configured to issue, to the first information processing devices other than the second information processing devices, an activation prohibition instruction to prohibit activation.

9 Claims, 16 Drawing Sheets

MANAGEMENT APPARATUS AND INFORMATION PROCESSING SYSTEM

CROSS-REFERENCE TO RELATED APPLICATION

This application is based upon and claims the benefit of priority of the prior Japanese Patent Application No. 2016-119789, filed on Jun. 16, 2016, the entire contents of which are incorporated herein by reference.

FIELD

The embodiments discussed herein are related to a management apparatus and an information processing system.

BACKGROUND

A management apparatus which manages a plurality of terminal devices broadcasts permission information at a predetermined cycle, and a terminal device which receives the permission information makes a transition to a usage permitted state and maintains the usage permitted state, so that a security of an information processing system is secured. A monitor device for monitoring power consumption monitors power consumption of electric equipment, which is measured by a smart outlet. When the power consumption is equal to or smaller than a predetermined amount, a part of the function of the monitor device transitions to a power-saving state, so that the power consumption of the entire system may be reduced.

Related techniques are disclosed in, for example, Japanese Laid-Open Patent Publication No. 2011-204056 and Japanese Laid-Open Patent Publication No. 2013-148967.

SUMMARY

According to an aspect of the present invention, provided is a management apparatus including a memory and a processor coupled to the memory. The processor is configured to broadcast an activation request to a plurality of information processing devices having a reception period during which the activation request is received. The reception period occurs in a predetermined cycle. The processor is configured to receive a confirmation response from first information processing devices among the plurality of information processing devices. The first information processing devices receive the activation request. The processor is configured to issue an activation instruction to a predetermined number of second information processing devices among the first information processing devices. The activation instruction instructs to activate the second information processing devices. The processor is configured to issue, to the first information processing devices other than the second information processing devices, an activation prohibition instruction to prohibit activation.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In an information processing system having a plurality of information processing devices and a management apparatus which broadcasts an activation request to the information processing devices for activating the information processing devices, all information processing devices which receive the activation request from the management apparatus are activated. Therefore, when more information processing devices than those used for information processing are activated by broadcasting the activation request, a redundant power may be consumed.

Hereinafter, embodiments will be described with reference to the drawings.

First Embodiment

Figure 1:
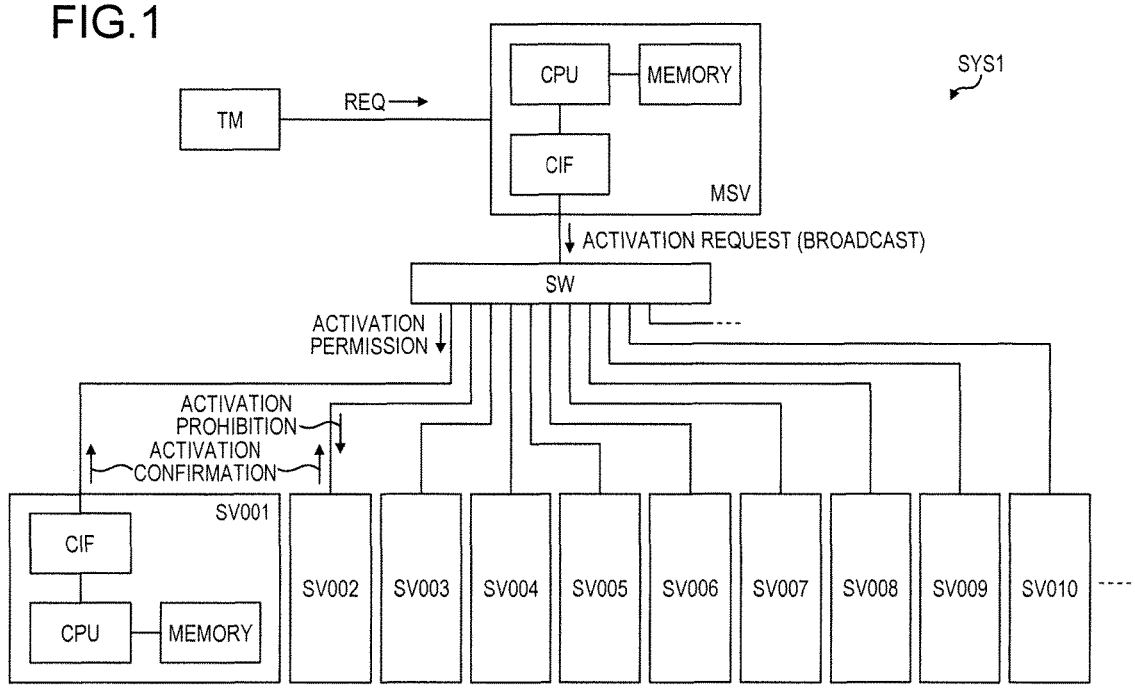
FIG. 1 is a diagram illustrating an exemplary configuration of an information processing system according to a first embodiment.

FIG. 1 illustrates an exemplary configuration of an information processing system according to a first embodiment. The information processing system SYS1 illustrated in FIG. 1 includes a plurality of processing servers SV (SV001, SV002, . . . ) that perform information processing and a management server MSV that manages the processing servers SV. The management server MSV is an example of a management apparatus, and the plurality of processing servers SV are an example of a plurality of information processing devices. For example, each processing server SV is coupled to the management server MSV through a network switch SW. Each of the management server MSV and the processing server SV includes a central processing unit (CPU), a memory, and a communication interface unit CIF such as a network interface card (NIC). The CPU of the processing server SV is an example of a processing unit which executes information processing, and the communication interface unit CIF of the processing server SV is an example of a device-side communication processing unit.

In the management server MSV, the CPU executes a control program stored in the memory and manages activation and stop of the processing servers SV through the communication interface unit CIF. The communication interface unit CIF of the management server MSV is an example of a management-side communication processing unit. The management server MSV performs broadcast of transmitting an activation request to all processing servers SV in response to reception of a usage request REQ (including the number of processing servers SV to be activated) of the processing servers SV from a user who wants to use the processing servers SV. Further, the management server MSV performs control to activate processing servers SV corresponding to the specified number of processing servers, which is specified in the usage request REQ. The usage request REQ is issued from a terminal device TM when the user manipulates the terminal device TM. The usage request REQ may be issued from each of the plurality of terminal devices TM manipulated by a plurality of users.

The communication interface unit CIF of the processing server SV performs intermittent watch to monitor a usage request REQ during a reception period which is set to be a predetermined cycle while supply of power to the CPU and the memory is stopped. A generation cycle of generating the reception period and the time length of the reception period during which the processing server SV is allowed to receive a usage request REQ are set such that the number of communication interface units CIF of the processing server SV, which receive the usage request REQ, in the information processing system SYS1 becomes a predetermined number (e.g., 3 units). In the following description, a time period during which supply of power to the CPU and the memory is stopped is referred to as an intermittent watch period and a time period during which supply of power to the CPU and the memory is performed is referred to as a normal operation period. The reception period during which the processing server SV is allowed to receive the usage request REQ is repeatedly set at a predetermined cycle during the intermittent watch period but is not set during the normal operation period.

When the activation request is received from the management server MSV during the reception period, the communication interface unit CIF of the processing server SV notifies the management server MSV of activation confirmation of confirming whether to activate the processing server SV. The activation confirmation is an example of a confirmation response which is transmitted from the information processing device which receives the activation request. When notification of activation permission is received from the management server MSV in response to the activation confirmation, the communication interface unit CIF of the processing server SV performs supply of power to the CPU and the memory, and transitions the processing server SV from the intermittent watch period to the normal operation period. When notification of activation prohibition is received from the management server MSV in response to the activation confirmation, the communication interface unit CIF of the processing server SV continues the intermittent watch period. The notification of activation permission is an example of an activation instruction to the processing server SV to activate the CPU, and the notification of activation prohibition is an example of an activation prohibition instruction to the processing server SV to prohibit activation of the CPU.

Figure 2:
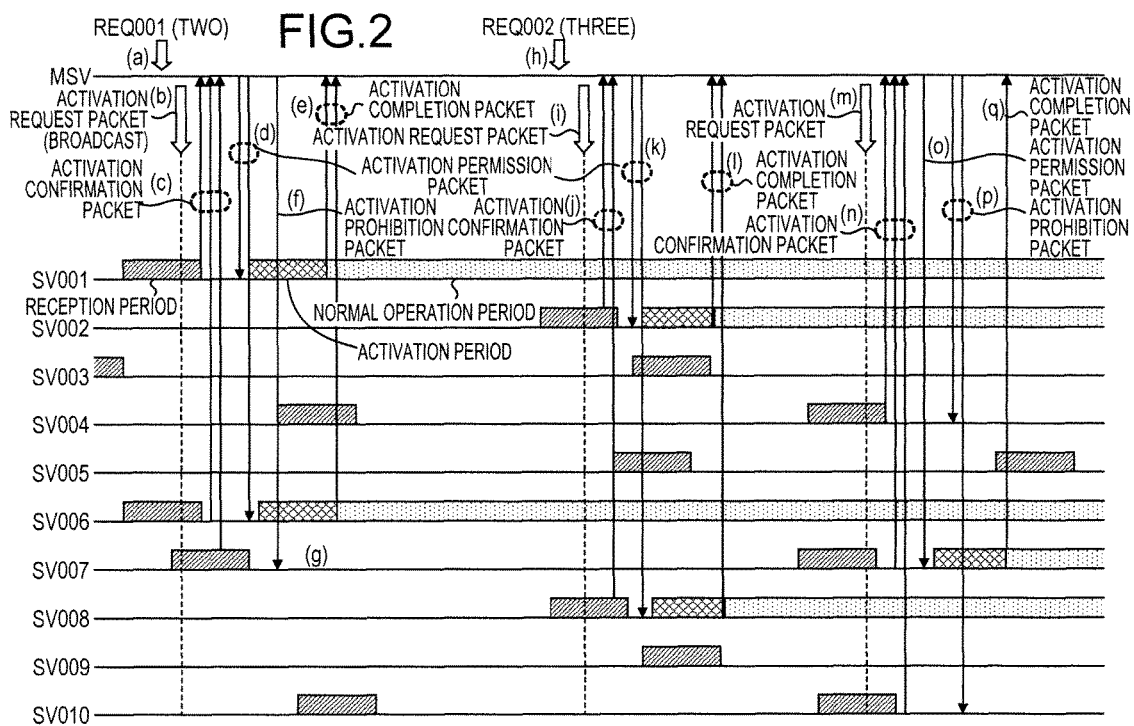
FIG. 2 is a diagram illustrating an exemplary operation of an information processing system illustrated in FIG. 1.

FIG. 2 illustrates an exemplary operation of the information processing system SYS1 illustrated in FIG. 1. In FIG. 2, the operation of the management server MSV indicates an example of a control method performed by the information processing device and a control program executed by the information processing device. In operations of the processing servers SV001 to SV010 illustrated in FIG. 2, an oblique line pattern indicates the reception period for monitoring an activation request packet representing a usage request, a netted pattern indicates the activation period of activating the processing server SV, and a dots hatch pattern indicates a normal operation period following the activation period.

Since the processing servers SV001 to SV010 operate asynchronously with each other, the reception period for monitoring the usage request packet is different between the processing servers SV001 to SV010. Therefore, the number of processing servers SV which receive the activation request packet which is broadcasted from the management server MSV to all the processing servers SV001 to SV010 varies each time. In the example illustrated in FIG. 2, the time length of the reception period of each of the processing servers SV and the generation cycle of the reception period are set such that three processing servers SV receive the activation request packet to be broadcasted on the average.

First, the management server MSV receives a usage request REQ001 (TWO), which specifies that the number of processing servers to be activated is two, from the terminal device TM which is manipulated by the user (see (a) of FIG. 2) and broadcasts an activation request packet to all the processing servers SV (see (b) of FIG. 2). In the example illustrated in FIG. 2, three processing servers SV001, SV006, and SV007, whose reception periods include the transmission timing of the activation request packet, receive the activation request packet and transmit an activation confirmation packet, which is a confirmation response of the activation request packet, to the management server MSV (see (c) of FIG. 2).

The management server MSV receives the activation confirmation packets and transmits an activation permission packet which notifies activation permission to the processing servers SV001 and SV006 among the processing servers SV001, SV006, and SV007 which transmit the activation confirmation packet (see (d) of FIG. 2). The activation permission packet is an example of an activation instruction which activates CPUs of a predetermined number of processing servers SV to be operable. The communication interface unit CIF of each of the processing servers SV001 and SV006 outputs an instruction for supplying power to the CPU and the memory to, for example, a power control unit in response to the reception of the activation permission packet and allows the CPU to perform an activation process.

Therefore, the processing servers SV001 and SV006 the number of which is specified in the usage request REQ001 are activated, and the activated processing servers SV001 and SV006 may execute an application or the like after the activation period. After the activation process is completed, the processing servers SV001 and SV006 transmit an activation completion packet notifying the management server MSV of completion of the activation process (see (e) of FIG. 2)

In the meantime, the management server MSV transmits an activation prohibition packet notifying prohibition of activation to the remaining processing server SV007 to which the activation permission packet is not transmitted, among the processing servers SV001, SV006, and SV007 which transmit the activation confirmation packet (see (f) of FIG. 2). The activation prohibition packet is an example of an activation prohibition instruction transmitted to the processing server SV to prohibit an activation process performed by the CPU. The communication interface unit CIF of the processing server SV007 which receives the activation prohibition packet does not output an instruction for supplying power to the CPU and the memory but continues the intermittent watch period (see (g) of FIG. 2). Therefore, even when the processing servers SV asynchronously set the reception period of the activation request packet with each other and the number of processing servers SV which transmit the activation confirmation packet is probabilistically changed, the number of processing servers SV specified in the usage request REQ001 may be activated.

Next, the management server MSV receives a usage request REQ002 (THREE), which specifies that the number of processing servers to be activated is three, from the terminal device TM (see (h) of FIG. 2) and broadcasts an activation request packet to all the processing servers SV (see (i) of FIG. 2). Two processing servers SV002 and SV008 receive the activation request packet and transmit an activation confirmation packet to the management server MSV (see (j) of FIG. 2). The usage requests REQ001 and REQ002 may be issued from one terminal device TM which is manipulated by the same user or respectively issued from two terminal devices TM which are manipulated by different users.

Since the number of processing servers SV002 and SV008 which transmit the activation confirmation packet does not satisfy the specified number of processing servers to be activated, which is specified in the usage request REQ002, the management server MSV transmits an activation permission packet to all the processing servers SV002 and SV008 (see (k) of FIG. 2). The processing servers SV002 and SV008 perform an activation process in response to the reception of the activation permission packet. After the activation process is completed, the processing servers SV002 and SV008 transmit an activation completion packet to the management server MSV (see (l) of FIG. 2). When the number of processing servers SV002 and SV008 which transmit the activation confirmation packet is equal to or less than the specified number of processing servers to be activated, which is specified in the usage request REQ002, the management server MSV does not issue an activation prohibition packet. Therefore, transmission of redundant packets from the management server MSV to the processing servers SV may be suppressed.

The management server MSV broadcasts an additional activation request packet to all processing servers SV in order to activate the remaining one processing server SV in response to the reception of the activation completion packet (see (m) of FIG. 2). In the example illustrated in FIG. 2, three processing servers SV004, SV007, and SV010 receive the activation request packet and transmit an activation confirmation packet to the management server MSV (see (n) of FIG. 2).

The management server MSV transmits an activation permission packet to the processing server S007 (see (o) of FIG. 2) and transmits an activation prohibition packet to the processing server SV004 and SV010 (see d (p) of FIG. 2) in order to activate the remaining one processing server SV. The processing server SV007 performs an activation process in response to the reception of the activation permission packet. After the activation process is completed, the processing server SV007 transmits an activation completion packet to the management server MSV (see (q) of FIG. 2). As described above, when the specified number of processing servers SV, which is specified in the usage request REQ002, is not activated by one activation request packet, an activation request packet is additionally transmitted to activate the specified number of processing servers SV, which is specified in the usage request REQ002.

Figure 3:
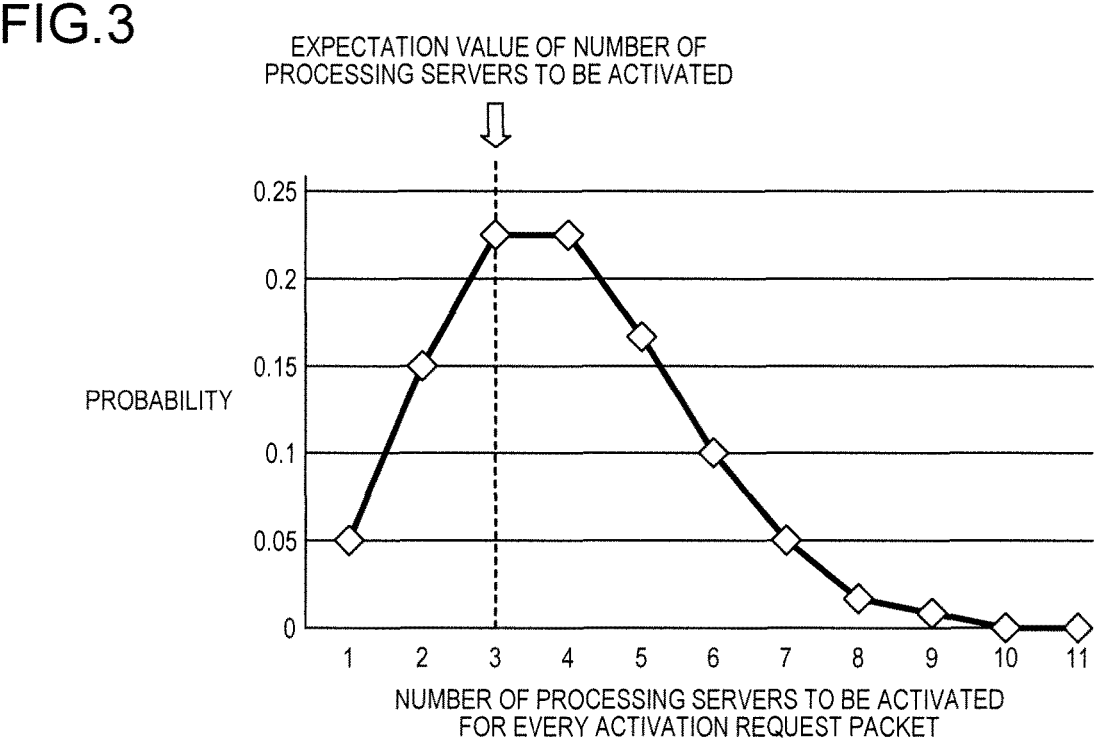
FIG. 3 is a diagram illustrating an example of a dispersion of the number of activated processing servers when respective processing servers perform an activation process in response to an activation request packet without receiving permission by an activation permission packet.

FIG. 3 is a diagram illustrating an example of a dispersion of the number of activated processing servers when the processing servers SV perform an activation process in response to an activation request packet without receiving permission by an activation permission packet. FIG. 3 indicates the number of activated processing servers when the time length of the reception period of each of the processing servers SV and the generation cycle of the reception period are set such that three processing servers SV receive the activation request packet to be broadcasted on the average.

When the communication interface unit CIF of each processing server SV sets the reception period of an activation request packet to be a predetermined time period and to have a predetermined time length, and thus the reception periods are scattered without being synchronized between the processing servers SV, the number of processing servers SV which receive the activation request packet becomes a random number event. Typically, a probability distribution of the number of processing servers SV to be activated is a Poisson distribution. Therefore, even though the reception period is set such that the average number of processing servers SV to be activated in response to an activation request packet is three, the number of processing servers SV which are actually activated varies. In the information processing system SYS1 which performs the operation illustrated in FIG. 2, even though the probability distribution of the number of processing servers SV to be activated varies as illustrated in FIG. 3, the specified number of processing servers SV, which is specified in the usage request REQ, may be activated.

As described above, according to the first embodiment, in the information processing system SYS1 which broadcasts an activation request packet, activation of a processing server SV which is not used is suppressed, so that power consumption of the information processing system SYS1 may be reduced. Further, even though the processing servers SV asynchronously set the reception period of an activation request packet with each other and the number of processing servers SV which transmit an activation confirmation packet is probabilistically changed as illustrated in FIG. 3, only the specified number of processing servers SV, which is specified in the usage request REQ, may be activated.

When the specified number of processing servers SV, which is specified in the usage request REQ, is not activated by one activation request packet, an activation request packet is additionally transmitted to activate the specified number of processing servers SV, which is specified in the usage request REQ.

Second Embodiment

Figure 4:
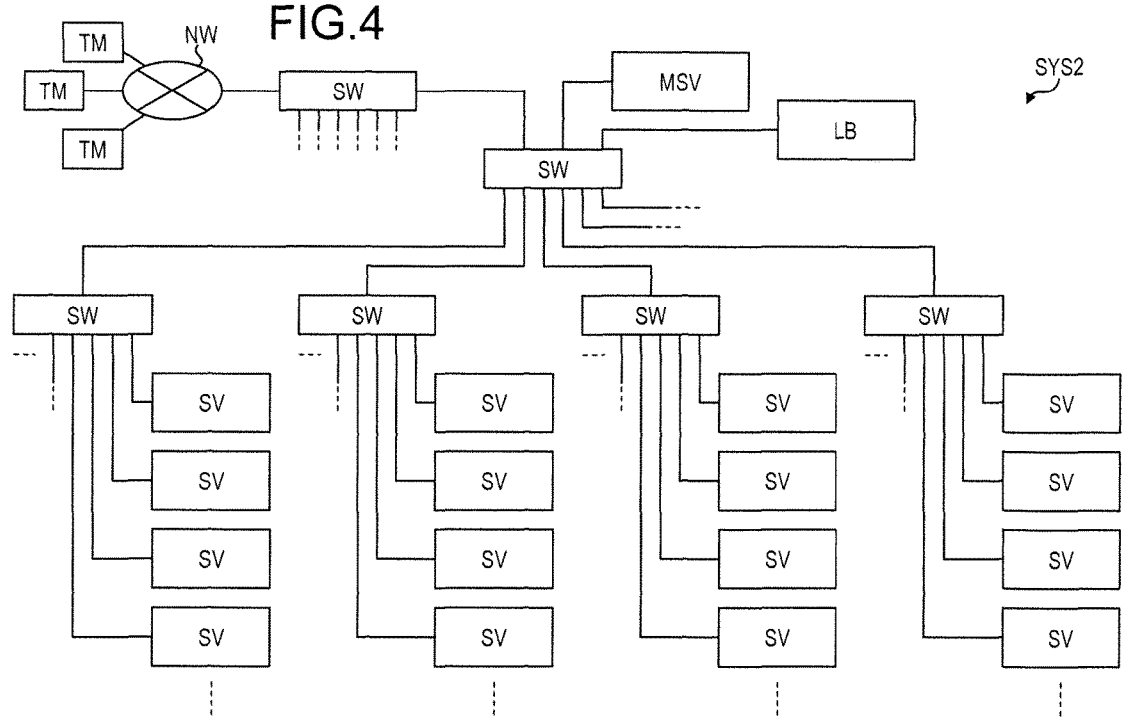
FIG. 4 is a diagram illustrating an exemplary configuration of an information processing system according to a second embodiment.

FIG. 4 illustrates an exemplary configuration of an information processing system according to a second embodiment. Components identical or similar to the components described with reference to FIGS. 1 to 3 are denoted by identical or similar reference numerals as used in FIGS. 1 to 3, and detailed descriptions thereof will be omitted. An information processing system SYS2 illustrated in FIG. 4 has a plurality of processing servers SV, a management server MSV, a load balancer LB, and a plurality of network switches SW which couples the processing servers SV, the management server MSV, and the load balancer LB to each other.

The information processing system SYS2 may be coupled to a plurality of terminal devices TM through a network NW such as the Internet or an intranet. The information processing system SYS2 may be coupled to the plurality of terminal devices TM without the network NW. For example, the terminal device TM functions as a thin client which performs minimum processing such as data input/output processing. A virtual machine which is activated in a processing server SV is allocated to each of the terminal devices TM (users), for example, so that a virtual desktop infrastructure (VDI), in which data processing is performed by the virtual machine, is implemented by the information processing system SYS2.

The information processing system SYS2 is applied to a scale out system which increases the number of processing servers SV to be activated in accordance with increase/decrease of the load. The information processing system SYS2 may be applied to an education system which is simultaneously used by a plurality of students in an education spot or may be applied to an office processing system of a company. Each processing server SV may be used as a computer resource for data processing by a plurality of clients.

Each processing server SV is coupled to the management server MSV and the load balancer LB through the network switches SW, and is coupled to the terminal device TM through the network switches SW and the network NW. When the processing servers SV, the management server MSV, and the load balancer LB are coupled to each other through a local area network (LAN), the network switch SW is a LAN switch such as a layer 2 switch.

The management server MSV controls an overall operation of the information processing system SYS2. In response to a usage request of using processing servers SV, which is issued from a terminal device TM, the management server MSV performs processing to activate the specified number of processing servers SV to be activated, which is specified in the usage request. Further, in response to a stop request of stopping a processing server SV, which is issued from the terminal device TM, the management server MSV performs processing to stop the processing server SV which is instructed to be stopped.

The load balancer LB operates in accordance with an instruction from the management server MSV. The load balancer LB has a function of distributing a load of processing performed by the individual processing servers SV or a function of determining allocation of a virtual machine to be coupled to a terminal device TM to distribute the load of processing performed by the individual processing servers SV.

Figure 5:
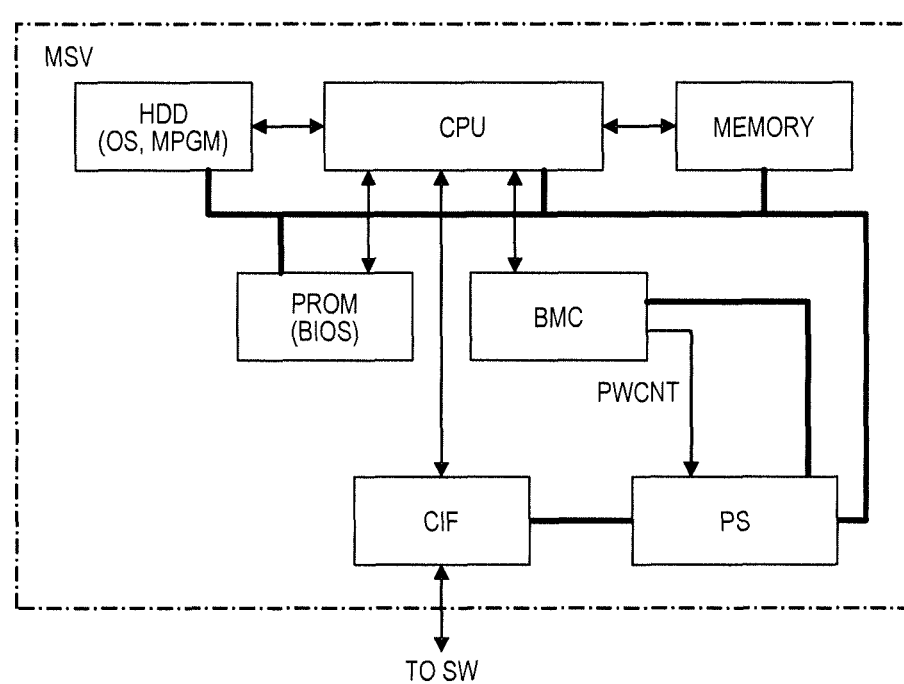
FIG. 5 is a diagram illustrating an exemplary configuration of a management server illustrated in FIG. 4.

FIG. 5 illustrates an exemplary configuration of the management server MSV illustrated in FIG. 4. In FIG. 5, a bold line indicates a supply of power line. The management server MSV includes a CPU, a memory, a hard disk drive (HDD), a programmable read-only memory (PROM), a baseboard management controller (BMC), a communication interface unit CIF, and a power supply unit PS.

The CPU executes a basic program such as a basic input/output system (BIOS) stored in the PROM and executes an operating system (OS) and a management program MPGM stored in the memory to implement a function as the management server MSV. The OS and the management program MPGM are transmitted from the HDD to the memory at the time of activating the management server MSV.

The memory is a memory module such as a dual in-line memory module (DIMM) including a plurality of synchronous dynamic random access memories (SDRAMs) and is coupled to the CPU through a memory bus. In the PROM, firmware such as the BIOS to be activated at the time of supplying power to the CPU or being restarted is stored in advance. In the HDD, the OS and the management program MPGM are stored in advance.

The BMC manages an operating status of the CPU, the memory, the power supply unit PS, and a fan (not illustrated), which are mounted in the management server MSV. For example, the BMC outputs a power control signal PWCNT to the power supply unit PS and controls the power supply unit PS to supply power to the CPU, the HDD, the memory, and the PROM. Power is always supplied to the BMC and the communication interface unit CIF from the power supply unit PS. The communication interface unit CIF controls communications with the processing server SV and the load balancer LB illustrated in FIG. 4.

Figure 6:
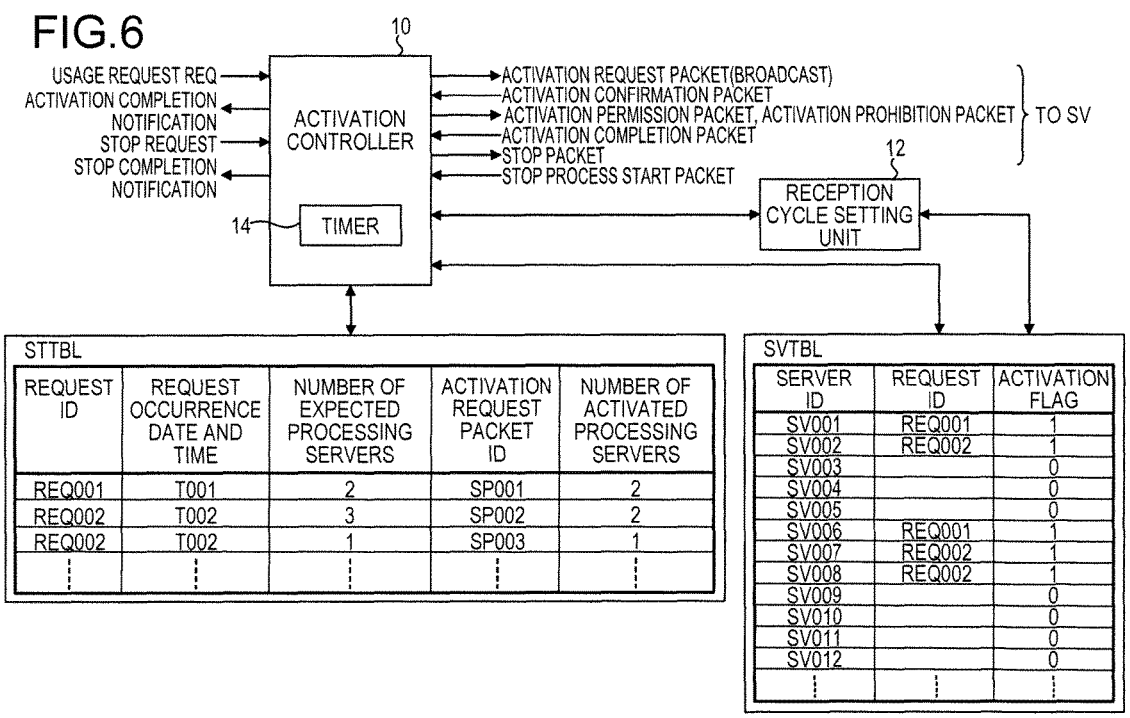
FIG. 6 is a diagram illustrating an exemplary functional configuration of a management server illustrated in FIG. 5.

FIG. 6 illustrates an exemplary functional configuration of the management server MSV illustrated in FIG. 5. The management server MSV includes an activation controller 10, a reception cycle setting unit 12, a server management table SVTBL, and an activation management table STTBL. The activation controller 10 and the reception cycle setting unit 12 are implemented by the management program MPGM which is executed by the CPU of the management server MSV. The activation controller 10 and the reception cycle setting unit 12 may be implemented by hardware. For example, the server management table SVTBL and the activation management table STTBL are allocated to the memory of the management server MSV.

When a usage request REQ of processing servers SV is received from a user (terminal device TM) who wants to use the processing servers SV through the network NW illustrated in FIG. 4, the activation controller 10 performs control of activating the specified number of processing servers SV to be activated, which is specified in the usage request REQ. After activating the specified number of processing servers SV to be activated, the activation controller 10 transmits an activation completion notification to the user (terminal device TM) who issues the usage request REQ.

When a stop request of the processing server SV is received from the user (terminal device TM), the activation controller 10 transmits a stop packet to the processing server SV corresponding to the stop request. The activation controller 10 transmits a stop completion notification to the user (terminal device TM) who issues the stop request, in response to reception of a stop process start packet from the processing server SV to which the stop packet is transmitted. After starting the stop process, and before shutting-down of power, the processing server SV transmits the stop process start packet to the management server MSV. The stop request is issued corresponding to the usage request REQ, and the activation controller 10 performs control of stopping the specified number of processing servers SV, which are activated in response to the usage request REQ, in response to the stop request corresponding to the usage request REQ.

The activation controller 10 transmits an activation request packet (broadcast), an activation permission packet, an activation prohibition packet, and a stop packet to a processing server SV through the communication interface unit CIF. The activation controller 10 receives an activation confirmation packet, an activation completion packet, and a stop process start packet from a processing server SV, through the communication interface unit CIF. The activation controller 10 includes a timer 14 which measures a predetermined time in response to transmission of an activation request packet. The activation controller 10 performs a reception process of receiving an activation confirmation packet until completion of measuring the predetermined time by the timer 14 after the transmission of the activation request packet. The meanings of the activation request packet, the activation confirmation packet, the activation permission packet, the activation prohibition packet, and the activation completion packet are the same as described with reference to FIG. 2.

The reception cycle setting unit 12 has a function of calculating a cycle of the reception period to be set in the communication interface unit CIF of each of the processing servers SV in response to the instruction from the activation controller 10. The reception period is a time period during which each processing server SV is capable of receiving a usage request REQ and is set to be a predetermined cycle. The reception periods are asynchronous with each other between processing servers SV. The reception cycle setting unit 12 calculates the number of processing servers SV which are stopped, in accordance with an instruction from the activation controller 10, with reference to the server management table SVTBL. The reception cycle setting unit 12 calculates a cycle of the reception period on the basis of the calculated number of the stopped processing servers SV and notifies the activation controller 10 of the calculated cycle of the reception period. The cycle of the reception period is set longer as the number of the stopped processing servers SV is larger, and is set shorter as the number of the stopped processing servers SV is smaller. The activation controller 10 may set the cycle of the reception period which is notified from the reception cycle setting unit 12 in at least one of the processing servers SV. A method for setting the cycle of the reception period will be described with reference to FIGS. 8 and 9. The time length of the reception period (a time length of an oblique line pattern illustrated in FIG. 2) is commonly set between the processing servers SV.

The server management table SVTBL has entries each including an areas where a request identifier (ID) for identifying a usage request REQ and an activation flag indicating whether a processing server SV is activated are stored, respectively, for each server ID for identifying a processing server SV. In FIG. 6, "1" of the activation flag indicates that the processing server SV is activated, and "0" of the activation flag indicates that the processing server SV is stopped.

Whenever the activation controller 10 receives an activation completion packet from a processing server SV, the activation controller 10 stores the request ID in an entry of the server management table SVTBL, which corresponds to the activated processing server SV and sets the activation flag to be "1". Further, whenever the activation controller 10 transmits a stop packet to a processing server SV, the activation controller 10 deletes the request ID stored in an entry of the server management table SVTBL, which corresponds to the stopped processing server SV and sets the activation flag to be "0".

The server management table SVTBL illustrated in FIG. 6 indicates that the processing servers SV001 and SV006 are activated in response to the usage request REQ001, and the processing servers SV002, SV007, and SV008 are activated in response to the usage request REQ002. That is, the server management table SVTBL illustrated in FIG. 6 indicates a state after the operation illustrated in FIG. 2 is completed.

The activation management table STTBL has entries each including areas for storing a request ID, a request occurrence date, the number of expected processing servers, an activation request packet ID, and the number of activated processing servers. The request ID is information for identifying a usage request REQ, the request occurrence date is information indicating a date when the usage request REQ occurs, and an initial value of the number of expected processing servers is the specified number of processing servers to be activated, which is specified in the usage request REQ. The activation request packet ID is information for identifying an activation request packet issued by the activation controller 10 in response to the usage request REQ, and the number of activated processing servers is information indicating the number of processing servers SV which are activated in response to the activation request packet.

An entry in a first row of the activation management table STTBL illustrated in FIG. 6 indicates that, in response to a usage request REQ001 which is generated at the date and time T001 and requests to use two processing servers, an activation request packet SP001 is issued and two processing servers SV are activated. An entry in a second row of the activation management table STTBL indicates that, in response to a usage request REQ002 which is generated at the date and time T002 and requests to use three processing servers, an activation request packet SP002 is issued and two processing servers SV are activated.

An entry in a third row of the activation management table STTBL indicates that, in response to the usage request REQ002 which is generated at the date and time T002 and requests to use three processing servers, an additional activation request packet SP003 is issued and one processing server SV is activated. That is, the activation management table STTBL illustrated in FIG. 6 illustrates a state set by the operation illustrated in FIG. 2.

Figure 7:
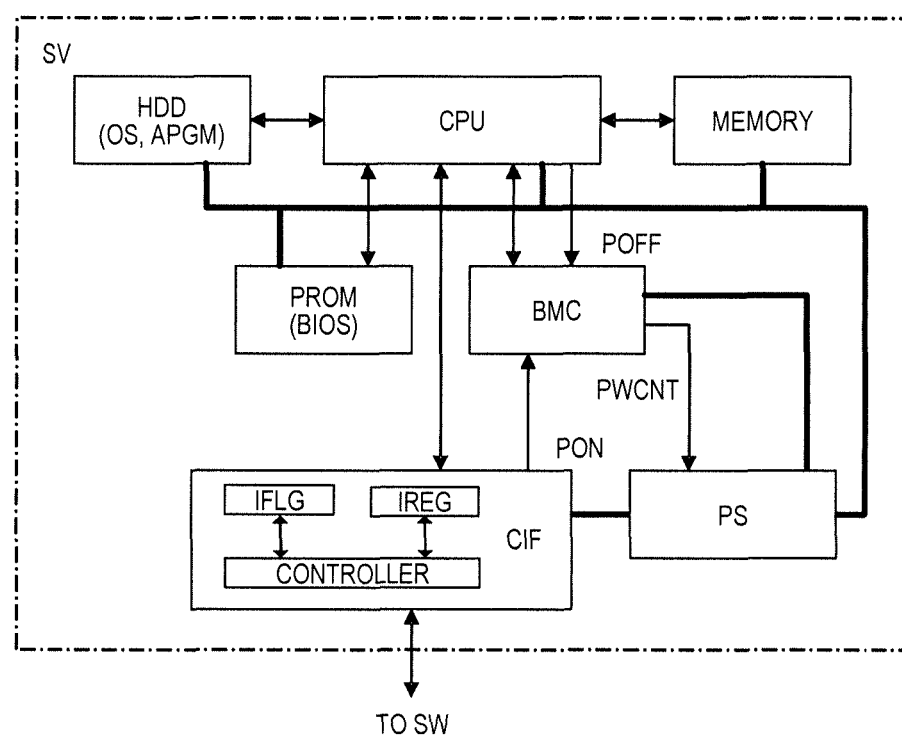
FIG. 7 is a diagram illustrating an exemplary configuration of a processing server illustrated in FIG. 4.

FIG. 7 illustrates an exemplary configuration of the processing server SV illustrated in FIG. 4. A detailed description of the configuration similar to or the same as the management server MSV illustrated in FIG. 5 will be omitted. Similarly to the management server MSV, the processing server SV includes a CPU, a memory, an HDD, a PROM, a BMC, a communication interface unit CIF, and a power supply unit PS.

The CPU executes a basic program such as a BIOS stored in the PROM and executes an OS, an application program APGM, and others stored in the memory to implement a function as the processing server SV. The OS, the application program APGM, and others are transmitted from the HDD to the memory at the time of activating the processing server SV. In the HDD, the OS, the application program APGM, and others are stored in advance. The OS which is executed by the CPU of a processing server SV has a function of outputting, when an instruction for stopping the processing server SV is received through the communication interface unit CIF, a stop instruction POFF to the BMC to stop supply of power to the CPU, the HDD, the memory, and the PROM.

The BMC manages an operating status of the CPU, the memory, the power supply unit PS, and a fan (not illustrated), which are mounted in the processing server SV. For example, the BMC outputs a power control signal PWCNT to the power supply unit PS and controls the power supply unit PS to supply power to the CPU, the HDD, the memory, and the PROM. When a stop instruction POFF is received from the CPU, the BMC stops supply of power to the CPU, the HDD, the memory, and the PROM. When an activation instruction PON is received from the communication interface unit CIF, the BMC starts supply of power to the CPU, the HDD, the memory, and the PROM. The power supply unit PS always supplies power to the BMC and the communication interface unit CIF.

The communication interface unit CIF controls communications with the management server MSV, the load balancer LB, and the terminal device TM illustrated in FIG. 4. Further, the communication interface unit CIF has a so-called "Wake on LAN function" for outputting an activation instruction PON to the BMC to activate the processing server SV, in response to an activation permission packet (see FIG. 2) from the management server MSV.

The communication interface unit CIF includes a controller, an interval register IREG, and an interval flag IFLG. The controller performs functions of the communication interface unit CIF. The controller is implemented by a program which is executed by a CPU. The controller may be implemented by hardware. In the interval register IREG, cycle information for setting a cycle of a time period for receiving an activation request packet (see FIG. 2) from the management server MSV is stored. In the interval flag IFLG, information indicating whether the interval register IREG is enabled or disabled is stored. In the interval register IREG, the cycle of the reception period calculated by the reception cycle setting unit 12 of the management server MSV illustrated in FIG. 6 is stored by the activation controller 10 as the cycle information. The communication interface unit CIF in each processing server SV changes a cycle of the reception period represented by the oblique line pattern in FIG. 2 in accordance with the cycle information set in the interval register IREG.

The cycle of the reception period is set longer as the number of the stopped processing servers SV is larger, and is set shorter as the number of the stopped processing servers SV is smaller. Therefore, the dispersion of the number of processing servers SV which receive an activation request packet may be suppressed without depending on the number of the stopped processing servers SV. However, as illustrated in FIG. 3, since the reception periods are not synchronized between the processing servers SV, the number of processing servers SV which receive the activation request packet may vary.

In the second embodiment, the interval flag IFLG is set to be a value which validates the interval register IREG. When a value which invalidates the interval register IREG is set in the interval flag IFLG, the communication interface unit CIF always receives an activation request packet. Then, all the stopped processing servers SV transmit an activation confirmation packet to the management server MSV in response to the activation request packet. Alternatively, the cycle of the reception period may be set when a valid value is set in the interval register IREG without providing the interval flag IFLG. Further, an activation request packet may be always received when an invalid value is set in the interval register IREG.

Figure 8:
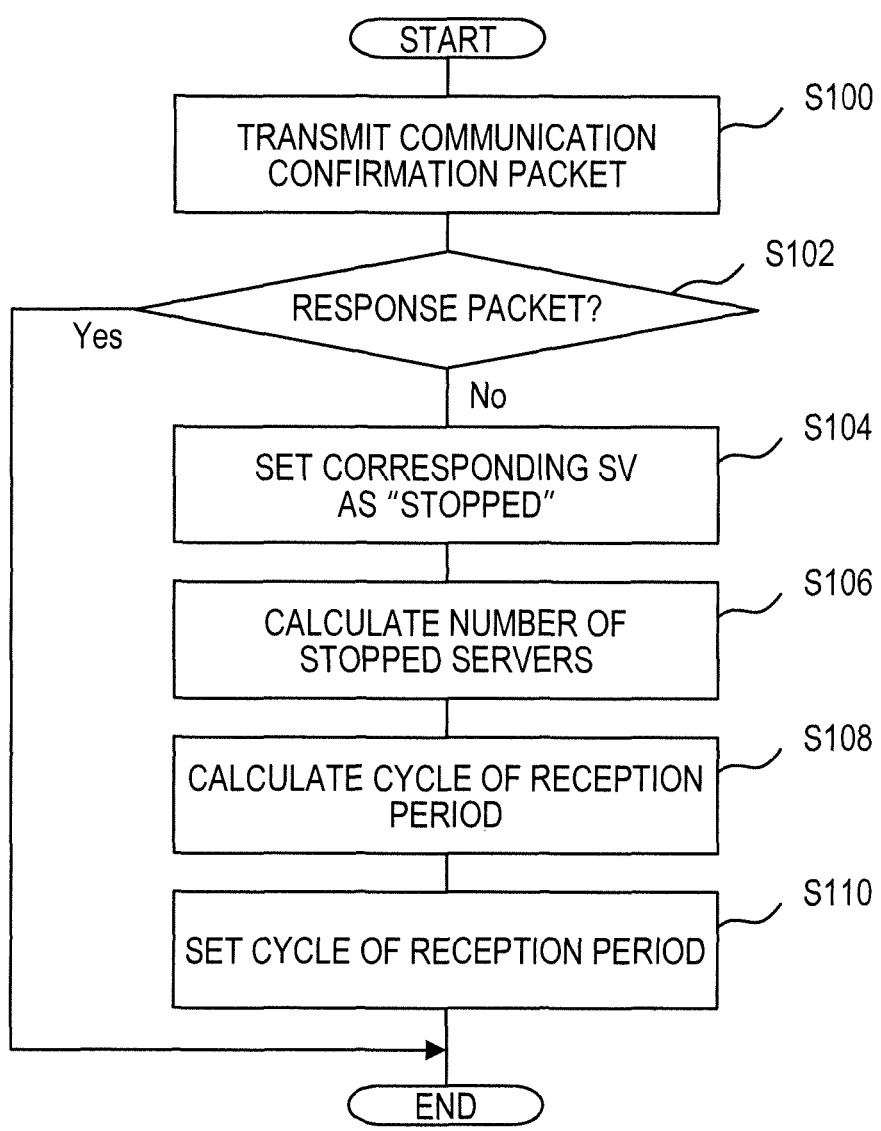
FIG. 8 is a diagram illustrating an exemplary operation for setting an interval register of a communication interface in a processing server illustrated in FIG. 7.

FIG. 8 illustrates an exemplary operation of setting an interval register IREG of the communication interface unit CIF in the processing server SV illustrated in FIG. 7. The process illustrated in FIG. 8 is performed by the activation controller 10 and the reception cycle setting unit 12 illustrated in FIG. 6 at a predetermined time interval. The activation controller 10 and the reception cycle setting unit 12 are implemented by a management program which is executed by the CPU of the management server MSV. That is, FIG. 8 illustrates an example of a control method of the management apparatus and a control program of the management apparatus.

First, in S100, the activation controller 10 of the management server MSV transmits a communication confirmation packet to one of the processing servers SV for confirming whether the one of the processing servers SV is activated or stopped. The processing servers SV to which a communication confirmation packet is transmitted are sequentially selected, and the communication confirmation packet is transmitted to all the processing servers SV during a predetermined time period.

Subsequently, in S102, the activation controller 10 determines whether a response packet is received from the processing server SV to which the communication confirmation packet is transmitted. When it is determined that no response packet is received until a predetermined time has elapsed, the activation controller 10 determines that the processing server SV to which the communication confirmation packet is transmitted is stopped, and the process proceeds to S104. When it is determined that a response packet is received until the predetermined time has elapsed, the activation controller 10 determines that the processing server SV to which the communication confirmation packet is transmitted is activated, and ends the process.

In S104, the activation controller 10 sets an activation flag in an entry of the server management table SVTBL, which corresponds to the processing server SV to which the communication confirmation packet is transmitted, as "stopped" (that is, "0"). Then, the activation controller 10 instructs the reception cycle setting unit 12 to calculate a cycle of the reception period. In S106, the reception cycle setting unit 12 accumulates the number of entries of the server management table SVTBL, in which the activation flag is set as "stopped", to calculate the number of stopped processing servers SV.

In S108, the reception cycle setting unit 12 calculates a cycle of the reception period during which an activation request packet is received, on the basis of the number of the stopped processing servers SV, which is calculated in S106, and notifies the activation controller 10 of the calculated cycle. For example, the reception cycle setting unit 12 calculates the cycle of the reception period such that an average number of processing servers SV which transmit an activation confirmation packet in response to an activation request packet is a predetermined expected value (e.g., "three" as illustrated in FIG. 3).

In S110, the activation controller 10 stores the cycle information indicating the cycle of the reception period notified by the reception cycle setting unit 12, in the interval register IREG (see FIG. 7) of the processing server SV to which the communication confirmation packet is transmitted, and ends the process. Alternatively, the management server MSV may transmit a notification packet including the cycle information to the processing server SV to which the communication confirmation packet is transmitted, and the cycle information may be stored in the interval register IREG by the communication interface unit CIF of the processing server SV.

The management server MSV calculates the cycle of the reception period on the basis of the number of the stopped processing servers SV, at a time when it is determined that the processing server SV is stopped, by using the communication confirmation packet. By doing this, the reception period may be set to an optimal cycle depending on the number of processing servers SV which are currently stopped. That is, the average number of processing servers SV which transmit an activation confirmation packet may be set to be an expected value.

Figure 9:
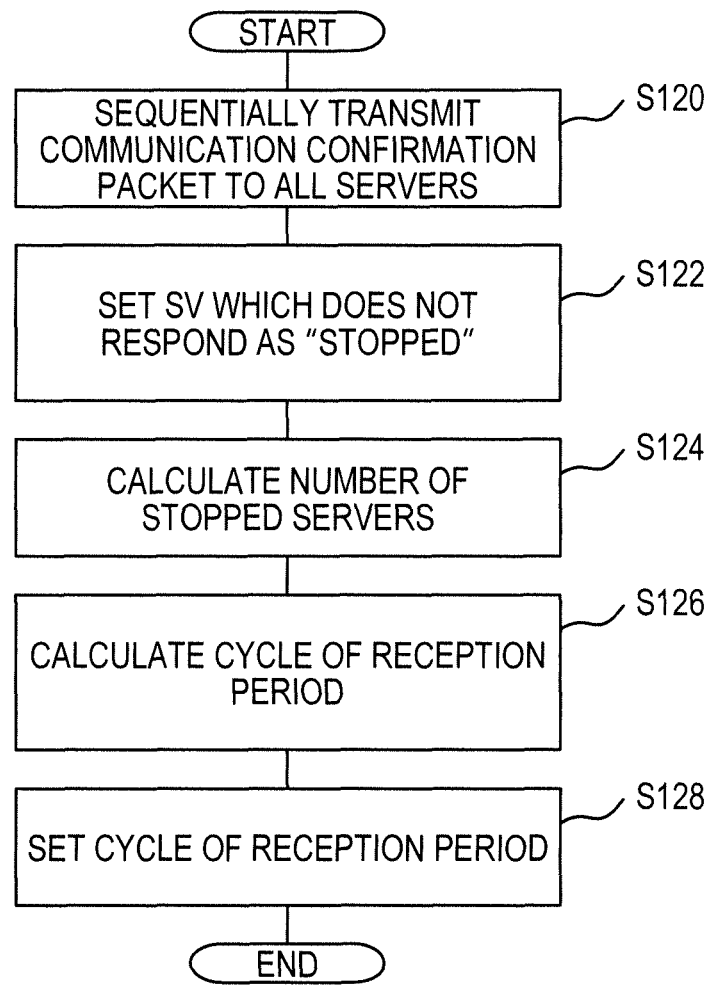
FIG. 9 is a diagram illustrating an exemplary operation for setting an interval register of a communication interface in a processing server illustrated in FIG. 7.

FIG. 9 illustrates another exemplary operation of setting an interval register IREG of the communication interface unit CIF in the processing server SV illustrated in FIG. 7. A detailed description of processing which is similar to or the same as those of FIG. 8 will be omitted. The process illustrated in FIG. 9 is performed by the activation controller 10 and the reception cycle setting unit 12 illustrated in FIG. 6 with a predetermined time interval which is longer than the activation interval of the process illustrated in FIG. 8. The process illustrated in FIG. 9 may be performed whenever an activation process of activating processing servers SV in response to reception of a usage request REQ is completed in the operation illustrated in FIG. 2. FIG. 9 illustrates an example of a control method of the management apparatus and a control program of the management apparatus.

First, in S120, the activation controller 10 of the management server MSV sequentially transmits a communication confirmation packet to all the processing servers SV. The communication confirmation packet may be broadcasted. Next, in S122, the activation controller 10 waits for an elapse of a predetermined time and determines whether a response packet issued in response to the communication confirmation packet is received from each processing server SV. The activation controller 10 sets, as "stopped" (that is, "0"), an activation flag in an entry of the server management table SVTBL, which corresponds to respective processing servers SV from which no response packet is received. Then, the activation controller 10 instructs the reception cycle setting unit 12 to calculate a cycle of the reception period.

In S124, similarly to S106 illustrated in FIG. 8, the reception cycle setting unit 12 accumulates the number of entries of the server management table SVTBL, in which the activation flag is set as "stopped", to calculate the number of the stopped processing servers SV.

Next, in S126, similarly to S108 illustrated in FIG. 8, the reception cycle setting unit 12 calculates a cycle of the reception period during which an activation request packet is received, on the basis of the number of the stopped processing servers SV calculated in S124. Next, in S128, similarly to S110 illustrated in FIG. 8, the activation controller 10 stores the cycle information indicating the cycle of the reception period in the interval register IREG of the stopped processing server SV, and ends the process.

In FIG. 9, the management server MSV calculates the cycle of the reception period on the basis of the number of the stopped processing servers SV which are determined by using a communication confirmation packet which is transmitted to all the processing servers SV. By doing this, the reception period may be set to an optimal cycle depending on the number of processing servers SV which are currently stopped. That is, the average number of processing servers SV which transmit an activation confirmation packet may be set to be an expected value.

Figure 10:
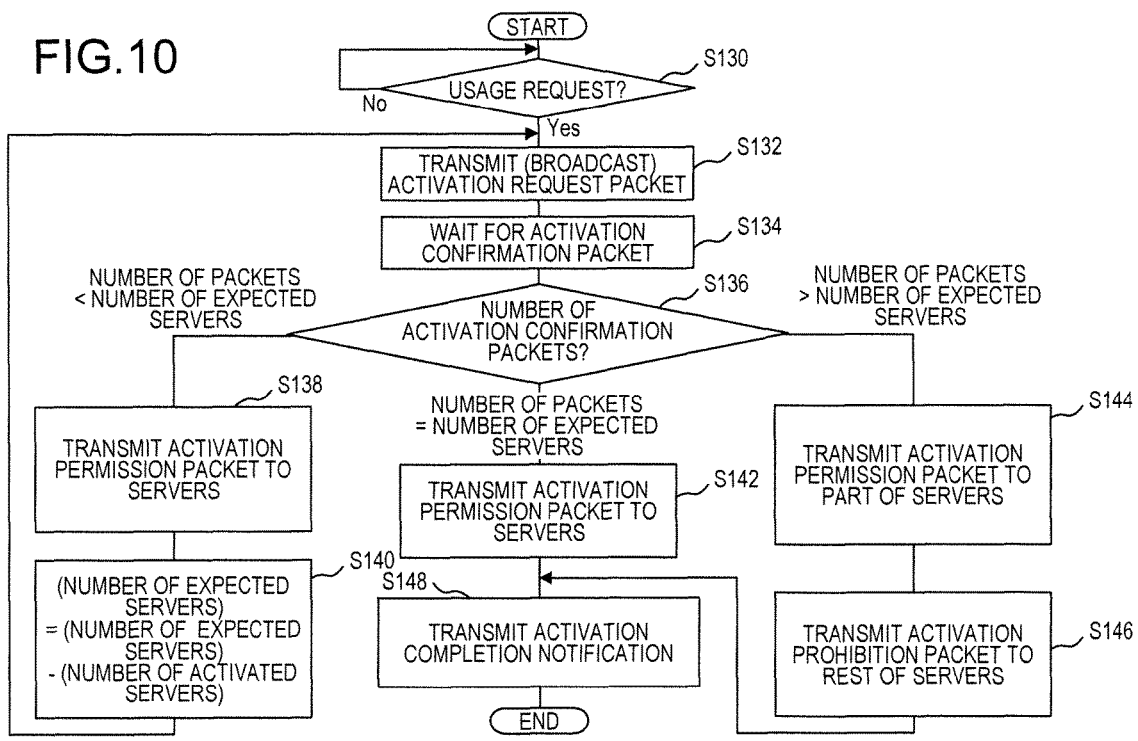
FIG. 10 is a diagram illustrating an example of an activation process of activating processing servers by a management server illustrated in FIG. 5.

FIG. 10 illustrates an example of an activation process of activating processing servers SV by the management server MSV illustrated in FIG. 5. The process illustrated in FIG. 10 is performed by the activation controller 10 illustrated in FIG. 6. FIG. 10 illustrates an example of a control method of the management apparatus and a control program of the management apparatus. The overall operation of the information processing system SYS2 is similar to the operation of the information processing system SYS1 illustrated in FIG. 2.

First, in S130, when a usage request REQ is received from a user (terminal device TM) who wants to use processing servers SV, the activation controller 10 proceeds to S132. In S132, the activation controller 10 transmits (broadcasts) an activation request packet to all the processing servers SV. Next, in S134, the activation controller 10 waits for an activation confirmation packet from the processing servers SV until a predetermined time measured by the timer 14 illustrated in FIG. 6 elapses.

Next, in S136, the activation controller 10 compares the number of the received activation confirmation packets with the number of expected processing servers. The initial value of the number of expected processing servers is the specified number of processing servers to be activated, which is specified in the usage request REQ. When it is determined that the number of the received activation confirmation packets is smaller than the number of expected processing servers, the activation controller 10 determines to issue an additional activation request packet and the process proceeds to S138. When it is determined that the number of the received activation confirmation packets is equal to the number of expected processing servers, the process proceeds to S142. When it is determined that the number of the received activation confirmation packets is larger than the number of expected processing servers, the process proceeds to S144.

In S138, the activation controller 10 transmits an activation permission packet to all of processing servers SV from which the activation confirmation packet is received. Thereafter, upon receiving an activation completion packet from a processing server SV, the activation controller 10 stores the request ID of the usage request REQ in the entry corresponding to the processing server SV, from which the activation completion packet is received, in the server management table SVTBL illustrated in FIG. 6, and sets the activation flag to be "1". Further, upon receiving activation completion packets from all the processing servers SV, the activation controller 10 adds a new entry in the activation management table STTBL illustrated in FIG. 6. In the new entry, information indicating the request ID of the usage request REQ, a date when the usage request REQ occurs, the number of expected processing servers, an activation request packet ID, and the number of processing servers SV activated by the activation request packet is stored. As described above, the activation controller 10 updates the server management table SVTBL and the activation management table STTBL corresponding to issuance of an activation permission packet.

Next, in S140, the activation controller 10 calculates a value obtained by subtracting the number of processing servers SV activated in S130 from the number of expected processing servers, as a new number of expected processing servers, and returns the process to S132. At this time, the activation controller 10 calculates the new number of expected processing servers on the basis of the number of expected processing servers and the number of activated processing servers stored in the entry of the activation management table STTBL, which corresponds to the usage request REQ. The new number of expected processing servers may be easily calculated by referring to the activation management table STTBL in which the number of activated processing servers SV, which corresponds to the usage request REQ, is stored, as compared with the case where the activation management table STTBL is not referred. Further, when the number of the received activation confirmation packets is smaller than the number of expected processing servers so that an additional activation request packet is broadcasted, the number of the received activation confirmation packets may be compared accurately in S136 by calculating the new number of expected processing servers. As a result, in S138, S142, and S144, the activation controller 10 may transmit an activation permission packet to an accurate number of processing servers SV.

In S142, the activation controller 10 transmits an activation permission packet to all the processing servers SV from which the activation confirmation packet is received. Thereafter, similarly to S138, the activation controller 10 updates the server management table SVTBL and the activation management table STTBL.

In S144, the activation controller 10 selects processing servers SV of the number which is the same as the number of expected processing servers from among the processing servers SV from which the activation confirmation packet is received, and transmits an activation permission packet to the selected processing servers SV. Thereafter, similarly to S138, the activation controller 10 updates the server management table SVTBL and the activation management table STTBL. Next, in S146, the activation controller 10 transmits an activation prohibition packet to processing servers SV which are not selected in S144, among the processing servers SV from which the activation confirmation packet is received, and proceeds to S148.

In S148, the activation controller 10 waits for receiving an activation completion packet from all the processing servers SV to which the activation permission packet is transmitted. Upon receiving the activation completion packet, the activation controller 10 transmits an activation completion notification indicating that activation of the specified number of processing servers SV to be activated, which is specified in the usage request REQ, is completed to the user (terminal device TM) from which the usage request REQ is received, and ends the activation process of activating processing servers SV.

Figure 11:
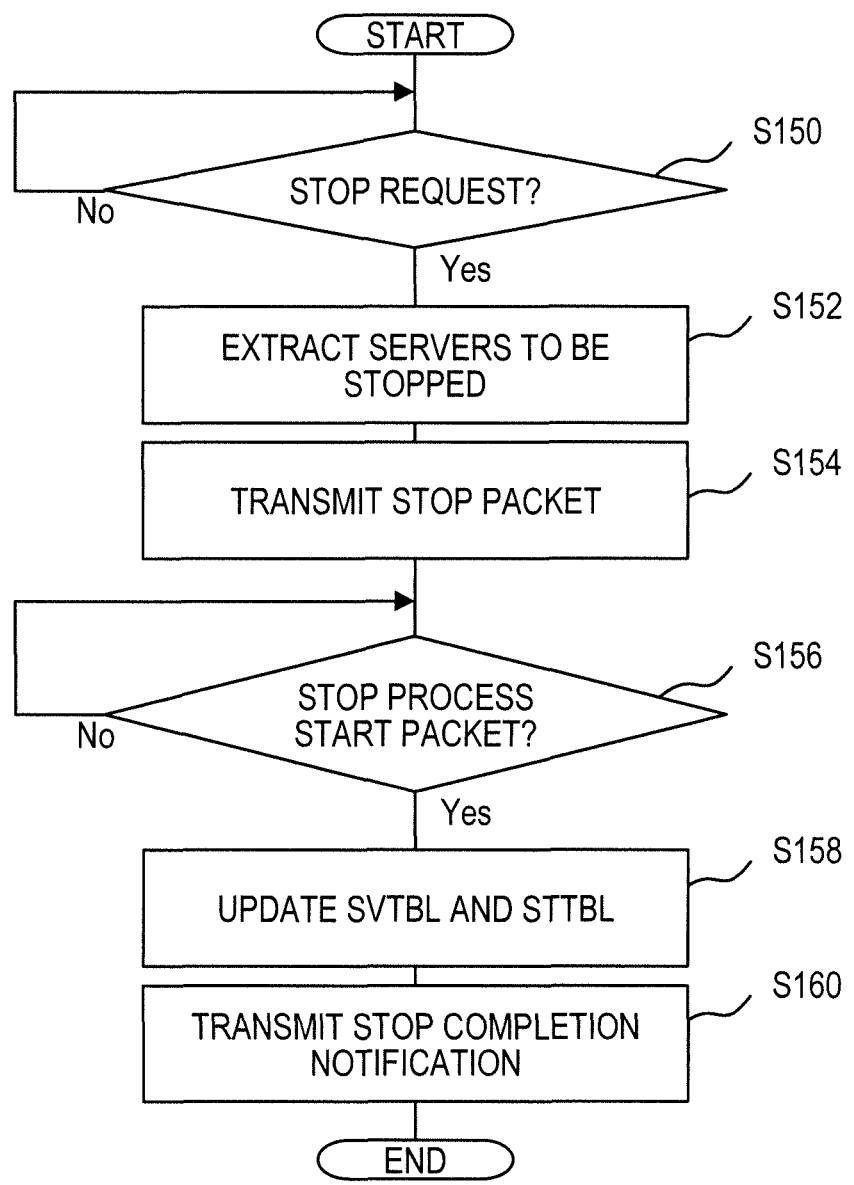
FIG. 11 is a diagram illustrating an example of a stop process of stopping processing servers by a management server illustrated in FIG. 5.

FIG. 11 illustrates an example of a stop process of stopping processing servers SV by the management server MSV illustrated in FIG. 5. The process illustrated in FIG. 11 is performed by the activation controller 10 illustrated in FIG. 6. FIG. 11 illustrates an example of a control method of the management apparatus and a control program of the management apparatus.

First, in S150, when a stop request is received from a user (terminal device TM) who wants to stop use of the processing servers SV, the activation controller 10 proceeds to S152. The stop request is transmitted from the user (terminal device TM) in association with the usage request REQ which activates the processing servers SV.

In S152, the activation controller 10 extracts, as processing servers SV to be stopped, processing servers SV corresponding to entries in which a usage request REQ corresponding to the stop request is stored, with reference to the server management table SVTBL. Next, in S154, the activation controller 10 transmits a stop packet to the processing servers SV extracted in S152.

Next, in S156, the activation controller 10 waits until a stop process start packet is received from all the processing servers SV to which the stop packet is transmitted. Upon receiving stop process start packets from all the processing servers SV to which the stop packet is transmitted, the process proceeds to S158.

In S158, the activation controller 10 deletes a request ID of the usage request REQ stored in a field of the request ID of the entries corresponding to the respective processing servers SV from which the stop process start packet is received, and sets a field of the activation flag to be "0", in the server management table SVTBL. Upon receiving the stop process start packets, the activation controller 10 deletes an entry in which the request ID corresponding to the stop request is stored, in the activation management table STTBL.

Next, in S160, the activation controller 10 transmits a stop completion notification indicating that the stop of the processing servers SV corresponding to the stop request is completed, to the user (terminal device TM) from which the stop request is received, and ends the stop process of stopping the processing servers SV.

Figure 12:
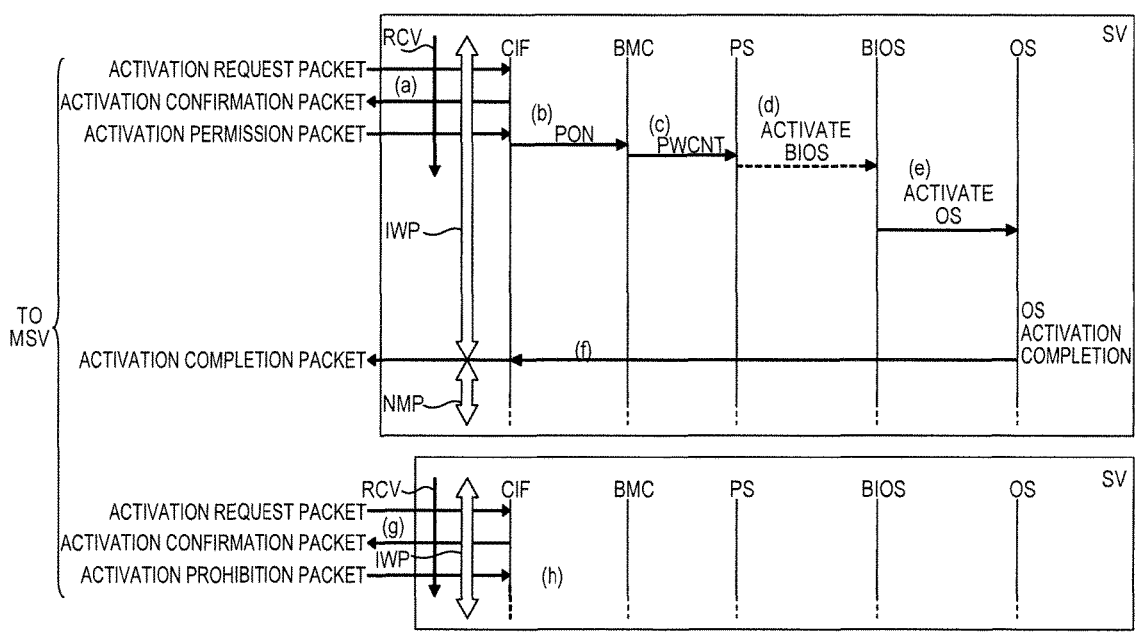
FIG. 12 is a diagram illustrating an exemplary operation of a processing server illustrated in FIG. 7.

FIG. 12 illustrates an exemplary operation of the processing server SV illustrated in FIG. 7. An upper portion of FIG. 12 illustrates an exemplary operation of the processing server SV upon receiving an activation permission packet from the management server MSV, and a lower portion of FIG. 12 illustrates an exemplary operation of the processing server SV upon receiving an activation prohibition packet from the management server MSV.

In the upper portion of FIG. 12, upon receiving an activation request packet during the reception period RCV within the intermittent watch period IWP, the communication interface unit CIF of each processing server SV transmits an activation confirmation packet to the management server MSV (see (a) of FIG. 12). Here, the intermittent watch period IWP is a time period during which supply of power to the CPU and the memory is stopped, and the reception period, during which a usage request REQ may be received, is set in a predetermined cycle.

Upon receiving an activation permission packet corresponding to the activation confirmation packet from the management server MSV, the communication interface unit CIF outputs an activation instruction PON to the BMC (see (b) of FIG. 12). When the activation permission packet corresponding to the activation confirmation packet is not received, the communication interface unit CIF continues the intermittent watch period IWP without outputting the activation instruction PON.

Upon receiving the activation instruction PON, the BMC outputs a power control signal PWCNT to the power supply unit PS to allow the power supply unit PS to start supply of power to the CPU and the memory (see (c) of FIG. 12). The BIOS is activated in response to the start of supply of power (see (d) of FIG. 12). The BIOS performs an initial setting of the hardware and loads the OS from the HDD into the memory by a boot loader and activates the OS (see (e) of FIG. 12).

The activated OS notifies an activation completion packet, which indicates that activation of the OS is completed, to the management server MSV through the communication interface unit CIF (see (f) of FIG. 12). The state of the processing server SV in which the OS is activated transitions from the intermittent watch period IWP to a normal operation period NMP.

Similarly to the upper portion of FIG. 12, in the lower portion of FIG. 12, upon receiving an activation request packet during the reception period RCV within the intermittent watch period IWP, the communication interface unit CIF of each processing server SV transmits an activation confirmation packet to the management server MSV (see (g) of FIG. 12). Upon receiving an activation prohibition packet corresponding to the activation confirmation packet from the management server MSV, the communication interface unit CIF continues the intermittent watch period IWP without outputting an activation instruction PON to the BMC (see (h) of FIG. 12). That is, a processing server SV which receives the activation prohibition packet maintains the stop state without activating the BIOS and the OS.

In the operation illustrated in FIG. 12, supply of power to the CPU and the memory starts in response to the reception of the activation permission packet from the management server MSV, so that power may be supplied only to the CPU and the memory of the processing server SV to be activated. As a result, as compared with the case where power is supplied to the CPU and the memory of the processing server SV which is not to be activated, the power consumption of the information processing system SYS2 may be reduced.

Figure 13:
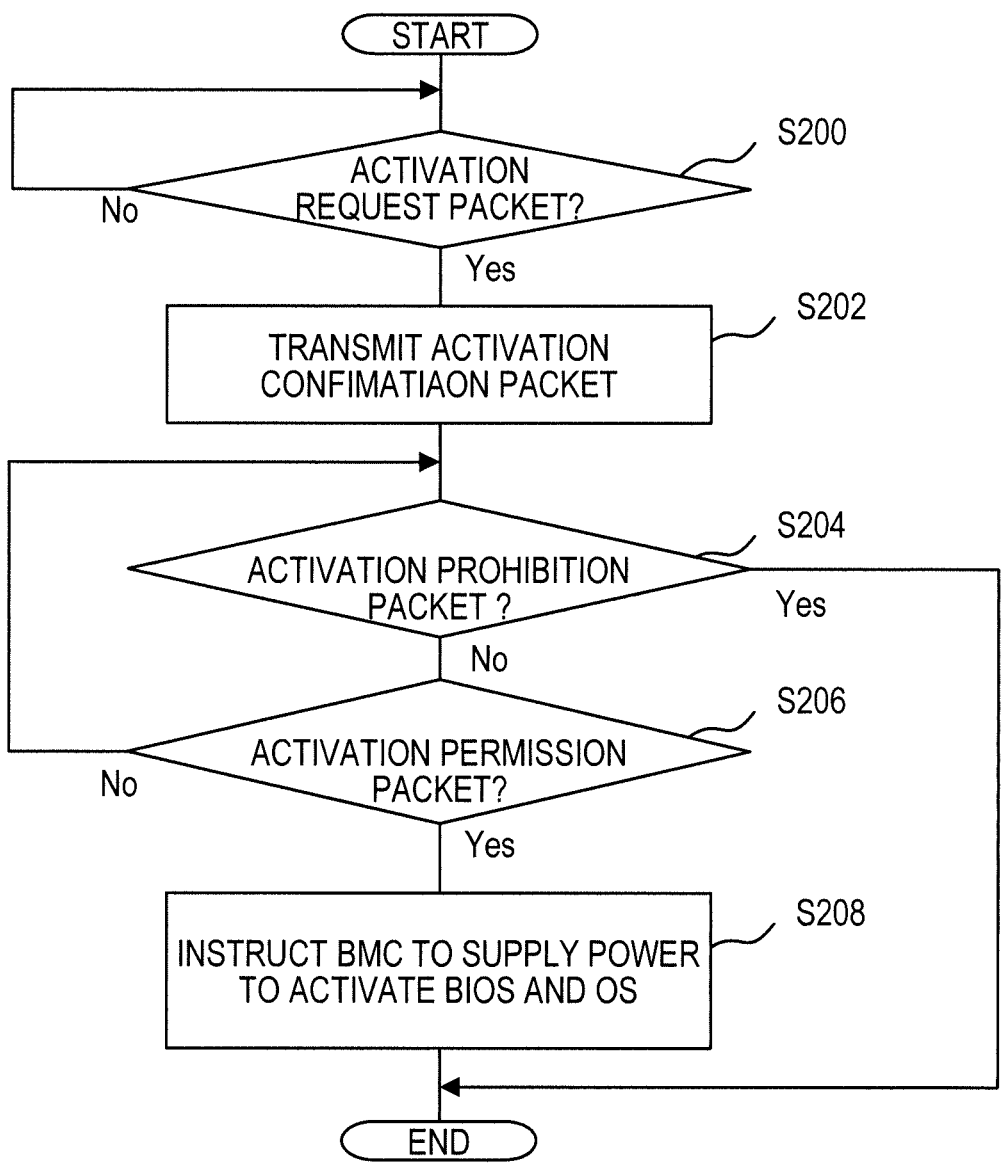
FIG. 13 is a diagram illustrating an example of a process performed by a communication interface in a processing server illustrated in FIG. 7 during an intermittent watch period.

FIG. 13 illustrates an example of a process performed by a communication interface unit CIF in the processing server SV illustrated in FIG. 7 during an intermittent watch period IWP. The process illustrated in FIG. 13 is repeatedly performed at a predetermined frequency.

First, in S200, the communication interface unit CIF in the processing server SV waits for reception of an activation request packet from the management server MSV and when it is determined that an activation request packet is received, proceeds to S202. In S202, the communication interface unit CIF transmits an activation confirmation packet to the management server MSV.

In S204, when it is determined that an activation prohibition packet is received from the management server MSV, the communication interface unit CIF ends the process, and when it is determined that an activation prohibition packet is not received from the management server MSV, proceeds to S206. In S206, when it is determined that an activation permission packet is received from the management server MSV, the communication interface unit CIF proceeds to S208, and when it is determined that an activation permission packet is not received from the management server MSV, returns the process to S204. In S208, the communication interface unit CIF instructs the BMC to supply power to the CPU and the memory to activate the BIOS and the OS, and ends the process.

As described above, according to the second embodiment, similar effects to the first embodiment may be obtained. For example, in the information processing system SYS2 which broadcasts an activation request packet, activation of a processing server SV which is not used is suppressed, so that power consumption of the information processing system SYS2 may be reduced. When the specified number of processing servers SV, which is specified in the usage request REQ, are not activated by one activation request packet, an activation request packet is additionally transmitted to activate the specified number of processing servers SV, which is specified in the usage request REQ.

According to the second embodiment, the following effects may be obtained. For example, a value obtained by subtracting the number of the received activation confirmation packets from the number of expected processing servers (initial value thereof is the specified number of processing servers to be activated, which is specified in the usage request REQ) is set to be a new number of expected processing servers, so that when an additional activation request packet is broadcasted, an activation permission packet may be transmitted to an accurate number of processing servers SV. The new number of expected processing servers is calculated with reference to the activation management table STTBL, so that the number of new processing servers may be easily calculated as compared with the case when the activation management table STTBL is not used.

When the number of processing servers SV which transmit an activation confirmation packet is equal to or smaller than the number of expected processing servers, the activation prohibition packet is not issued, so that the transmission of redundant packets from the management server MSV to processing servers SV may be suppressed.

By calculating the number of the stopped processing servers SV at a predetermined time interval and calculating the cycle of the reception period, the reception period may be set to an optimal cycle and the average number of processing servers SV which transmit an activation confirmation packet may be set to be an expected value. Supply of power to the CPU and the memory starts in response to the reception of the activation permission packet from the management server MSV, so that power may be supplied only to the CPU and the memory of the processing server SV to be activated. As a result, as compared with the case where power is supplied to the CPU and the memory of the processing server SV which is not to be activated, the power consumption of the information processing system SYS2 may be reduced.

Third Embodiment

Figure 14:
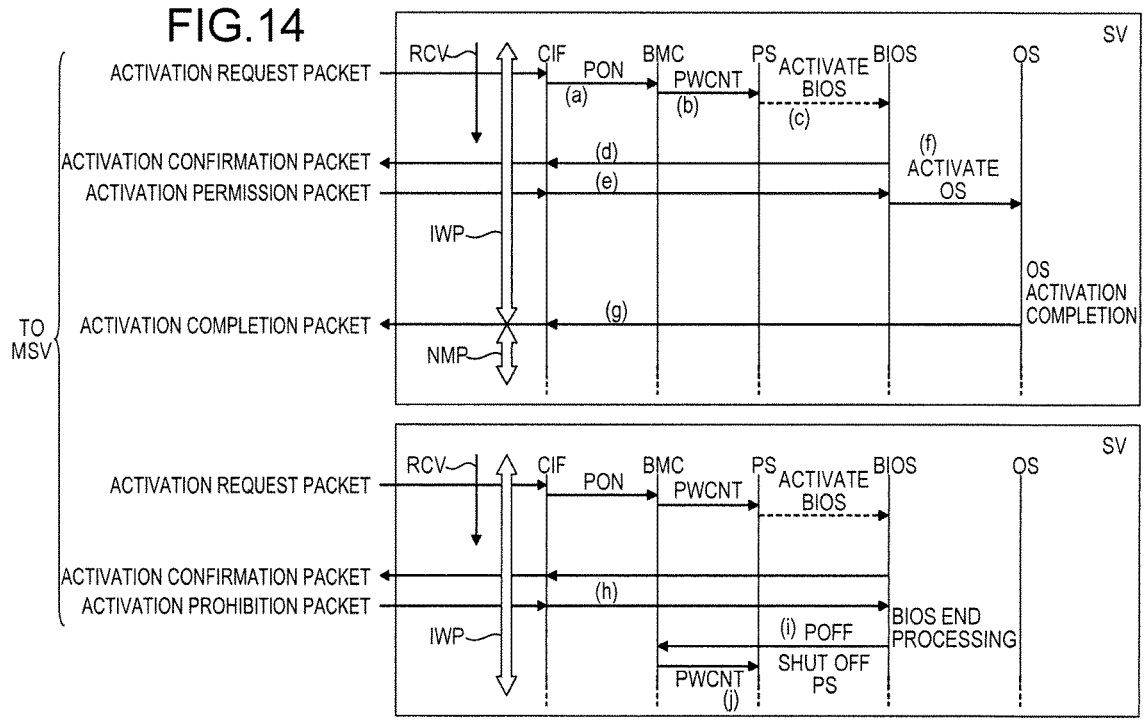
FIG. 14 is a diagram illustrating an exemplary operation of a processing server of an information processing system according to a third embodiment.

FIG. 14 is a diagram illustrating an exemplary operation of a processing server of an information processing system according to a third embodiment. The detailed description on the operation which is similar to or the same as that of FIG. 12 will be omitted. The configuration of the information processing system SYS2 is similar to the configuration of FIG. 4, the configuration of the management server MSV is similar to the configuration of FIG. 5, and the configuration of the processing server SV is similar to the configuration of FIG. 7. The operation of the management server MSV is similar to that of FIGS. 8 to 11. An overall operation of the information processing system is similar to that of FIG. 2.

An upper portion of FIG. 14 illustrates an exemplary operation of a processing server SV which receives an activation permission packet from the management server MSV and a lower portion of FIG. 14 illustrates an exemplary operation of a processing server SV which receives an activation prohibition packet from the management server MSV. In the example illustrated in FIG. 14, the communication interface unit CIF of the processing server SV instructs the BMC to supply power to the CPU and the memory to activate the BIOS (see (a), (b), and (c) of FIG. 14) in response to reception of an activation request packet from the management server MSV.

The activated BIOS transmits an activation confirmation packet to the management server MSV through the communication interface unit CIF (see (d) FIG. 14). Upon receiving an activation permission packet corresponding to the activation confirmation packet from the management server MSV, the communication interface unit CIF notifies the BIOS of the received activation permission packet (see (e) of FIG. 14). Upon receiving the notification from the communication interface unit CIF, the BIOS loads the OS from the HDD to the memory and activates the OS (see (f) of FIG. 14). Thereafter, the activated OS notifies an activation completion packet to the management server MSV through the communication interface unit CIF (see (g) of FIG. 14). Thereafter, the state of the processing server SV transitions from the intermittent watch period IWP to a normal operation period NMP.

In the lower portion of FIG. 14, the operation until the BIOS transmits the activation confirmation packet to the management server MSV is the same as the operation illustrated in the upper portion of FIG. 14. Upon receiving an activation prohibition packet corresponding to the activation confirmation packet from the management server MSV, the communication interface unit CIF notifies the BIOS of the received activation prohibition packet (see (h) of FIG. 14). Upon receiving the activation prohibition packet, The BIOS starts the stop process of stopping the BIOS. When it is allowed to stop the BIOS, the BIOS outputs, to the BMC, a stop instruction POFF to stop supply of power to the CPU and the memory (see (i) of FIG. 14). The BMC outputs, to the power supply unit PS, a power control signal PWCNT to stop supply of power to the CPU and the memory in response to the stop instruction POFF (see U) of FIG. 14). Then, power is shut off, the operation of the processing server SV stops and the status of the processing server SV maintains the intermittent watch period IWP.

In the operation illustrated in FIG. 14, the communication interface unit CIF has a function of outputting an activation instruction PON to the BMC to activate the BIOS, before receiving an activation confirmation packet, in response to reception of an activation request packet. That is, an operation of transmitting the activation confirmation packet and an operation of receiving an activation permission packet and an activation prohibition packet are performed not by the communication interface unit CIF, but by the BIOS. Accordingly, the operation illustrated in FIG. 14 may be implemented not by changing the communication interface unit CIF (hardware) but by changing software such as the BIOS.

In the operation illustrated in FIG. 14, the communication interface unit CIF of the processing server SV starts supply of power to the CPU and the memory in response to reception of an activation request packet from the management server MSV. Therefore, as compared with the case where supply of power to the CPU and the memory starts in response to reception of an activation permission packet, the time until the activation of the OS is completed after receiving the activation permission packet may be shortened.

Figure 15:
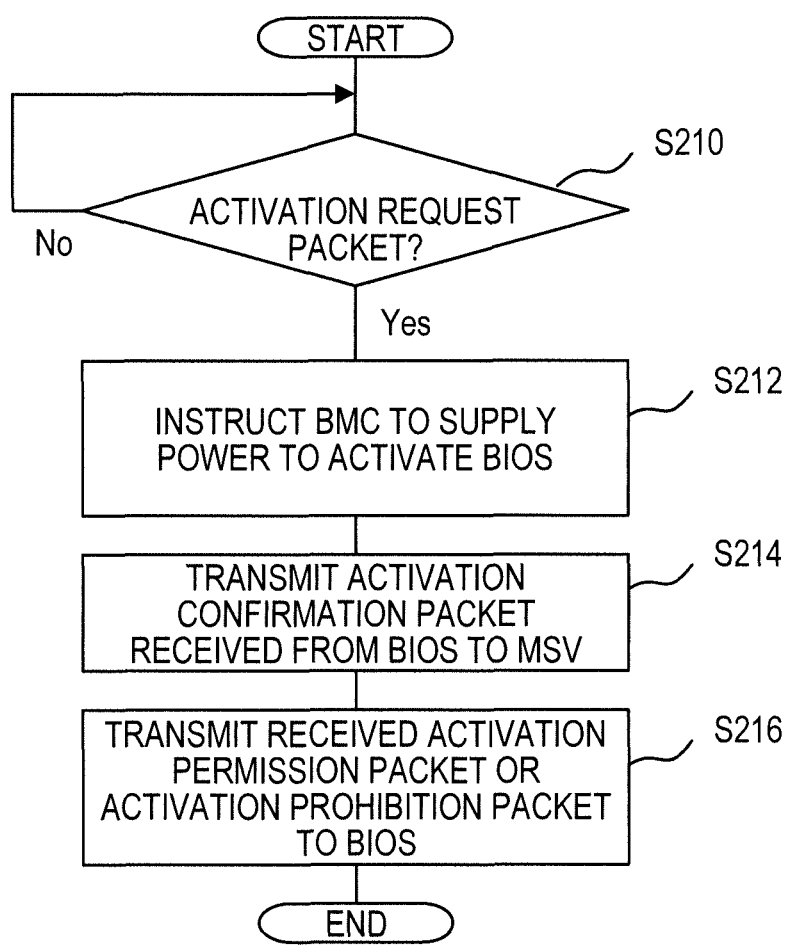
FIG. 15 is a diagram illustrating an exemplary operation of a communication interface in a processing server illustrated in FIG. 14.

FIG. 15 illustrates an example of a process performed by the communication interface unit CIF in the processing server SV illustrated in FIG. 14 during an intermittent watch period IWP. A detailed description of processing which is similar to or the same as those of FIG. 13 will be omitted. The process illustrated in FIG. 15 is repeatedly performed at a predetermined frequency.

First, similarly to S200 illustrated in FIG. 13, in S210, the communication interface unit CIF in the processing server SV waits for reception of an activation request packet from the management server MSV and when it is determined that an activation request packet is received, proceeds to S212. In S212, the communication interface unit CIF instructs the BMC to supply power to the CPU and the memory to activate the BIOS.

In S214, the communication interface unit CIF transmits the activation confirmation packet received from the BIOS to the management server MSV. In S216, upon receiving an activation permission packet or an activation prohibition packet from the management server MSV, the communication interface unit CIF transmits the received packet to the BIOS and ends the process.

Figure 16:
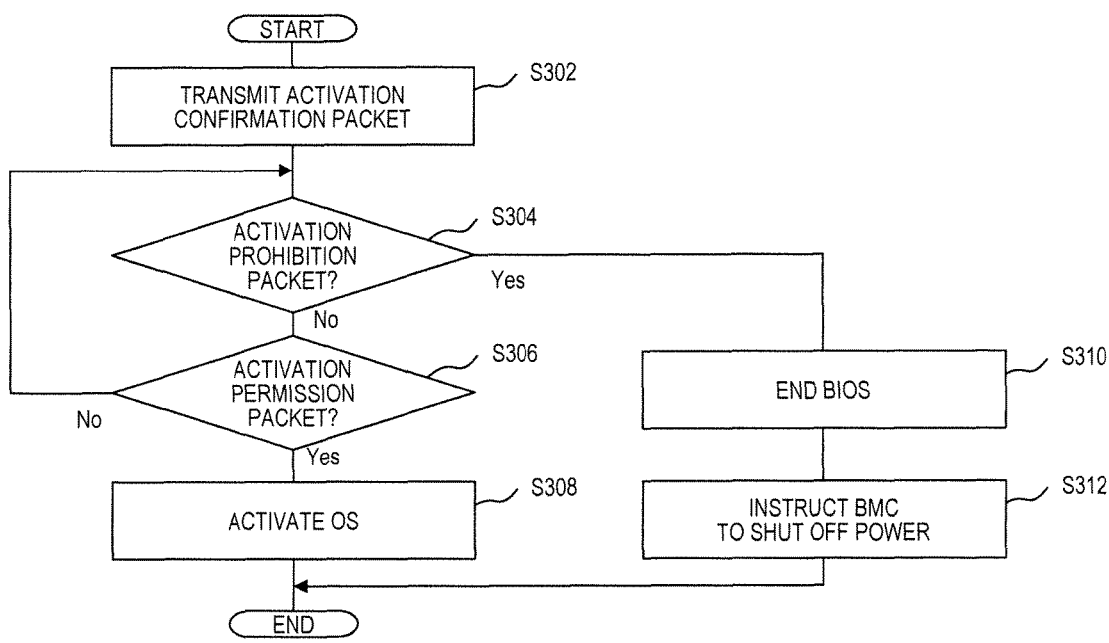
FIG. 16 is a diagram illustrating example of a process performed by a BIOS which is activated in a processing server illustrated in FIG. 14.

FIG. 16 illustrates an example of a process performed by a BIOS which is activated in the processing server SV illustrated in FIG. 14. First, in S302, the BIOS which is activated by being supplied with power transmits an activation confirmation packet to the management server MSV through the communication interface unit CIF. In S304, when it is determined that an activation prohibition packet is received from the management server MSV through the communication interface unit CIF, the BIOS proceeds to S310. When it is determined that an activation prohibition packet is not received from the management server MSV through the communication interface unit CIF, the BIOS proceeds to S306.

In S306, when it is determined that an activation permission packet is received from the management server MSV through the communication interface unit CIF, the BIOS proceeds to S308. When it is determined that an activation permission packet is not received from the management server MSV through the communication interface unit CIF, the BIOS returns the process to S304. In S308, the BIOS activates the OS and ends the process.

In S310, upon receiving the activation prohibition packet, the BIOS starts an end process of ending the BIOS. In S312, when it is allowed to stop the BIOS during the end process, the BIOS outputs an instruction to stop supply of power to the CPU and the memory to the BMC and ends the process.

As described above, according to the third embodiment, similar effects to the first and second embodiments may be obtained. For example, in the information processing system which broadcasts an activation request packet, activation of a processing server SV which is not used is suppressed, so that power consumption of the information processing system may be reduced.

According to the third embodiment, an operation of transmitting an activation confirmation packet and an operation of receiving an activation permission packet and an activation prohibition packet are performed not by the communication interface unit CIF, but by the BIOS. Accordingly, the operation illustrated in FIG. 14 may be implemented not by changing the communication interface unit CIF (hardware) but by changing software such as the BIOS.

Supply of power to the CPU, the memory, and others starts in response to reception of an activation request packet from the management server MSV, so that as compared with the operation illustrated in FIG. 12, the time until activation of the OS is completed after receiving an activation permission packet may be shortened. As a result, as compared with the case where supply of power to the CPU, the memory, and the others starts in response to reception of the activation permission packet, performance of the information processing system may be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A management apparatus, comprising:
a memory; and
a processor coupled to the memory and the processor configured to:
broadcast an activation request to a plurality of information processing devices having a reception period during which the activation request is received, the reception period occurring in a predetermined cycle;

receive a confirmation response from first information processing devices among the plurality of information processing devices, the first information processing devices receiving the activation request;
issue an activation instruction to a predetermined number of second information processing devices among the first information processing devices, the activation instruction instructing to activate the second information processing devices;
issue, to the first information processing devices other than the second information processing devices, an activation prohibition instruction to prohibit activation;
calculate a cycle of the reception period to make an average number of information processing devices which transmit the confirmation response corresponding to the activation request be a predetermined expectation value, basis of a number of third information processing devices among the plurality of information processing devices, the third information processing devices not being activated; and
set the calculated cycle, as the predetermined cycle, in at least one of the plurality of information processing devices.

2. The management apparatus according to claim 1, wherein the processor is configured to:
issue, when a number of the first information processing devices is smaller than the predetermined number, the activation instruction to all the first information processing devices and broadcast an additional activation request to the plurality of information processing devices.

3. The management apparatus according to claim 2, wherein the processor is configured to:
issue, when the additional activation request is broadcasted, the activation instruction to a first number of information processing devices among the plurality of information processing devices, the first number being at most a number obtained by subtracting a number of already activated information processing devices from the predetermined number.

4. The management apparatus according to claim 2, wherein the processor is configured to:
store numbers of information processing devices activated in response to the respective activation requests in an activation management table;
update the activation management table in response to issuance of the activation instruction; and
determine whether to output the additional activation request on basis of information stored in the activation management table.

5. The management apparatus according to claim 1, wherein the processor is configured to:
suppress, when a number of the first information processing devices is equal to or smaller than the predetermined number, issuance of the activation prohibition instruction.

6. An information processing system, comprising:
a plurality of information processing devices each including:
a first processor configured to:
receive an activation request during a reception period which occurs in a predetermined cycle; and
transmit a confirmation response upon receiving the activation request; and a management apparatus including:
a second processor configured to:
broadcast the activation request to the plurality of information processing devices;
receive the confirmation response from first information processing devices among the plurality of information processing devices, the first information processing devices receiving the activation request;
issue an activation instruction to a predetermined number of second information processing devices among the first information processing devices, the activation instruction instructing to activate the second information processing devices;
issue, to the first information processing devices other than the second information processing devices, an activation prohibition instruction to prohibit activation;
calculate a cycle of the reception period to make an average number of information processing devices which transmit the confirmation response corresponding to the activation request be a predetermined expectation value, on basis of a number of third information processing devices among the plurality of information processing devices, the third information processing devices not being activated; and
set the calculated cycle, as the predetermined cycle, in at least one of the plurality of information processing devices.

7. The information processing system according to claim 6, wherein
the plurality of information processing devices each further including:
a third processor configured to:
be activated upon being supplied with power; and
perform information processing in accordance with a received instruction, and
the first processor is configured to:
perform control to supply power to the third processor upon receiving the activation instruction.

8. The information processing system according to claim 6, wherein
the plurality of information processing devices each further including:
a third processor configured to:
perform information processing in accordance with a received instruction, and
the first processor is configured to:
perform control to supply power to the third processor upon receiving the activation request; and
activate the third processor upon receiving the activation instruction.

9. A non-transitory computer-readable recording medium having stored therein a program that causes a computer to execute a process, the process comprising:
broadcasting an activation request to a plurality of information processing devices having a reception period during which the activation request is received, the reception period occurring in a predetermined cycle;
receiving a confirmation response from first information processing devices among the plurality of information processing devices, the first information processing devices receiving the activation request;
issuing an activation instruction to a predetermined number of second information processing devices among the first information processing devices, the activation instruction instructing to activate the second information processing devices;

issuing, to the first information processing devices other than the second information processing devices, an activation prohibition instruction to prohibit activation;

calculating a cycle of the reception period to make an average number of information processing devices which transmit the confirmation response corresponding to the activation request be a predetermined expectation value, on basis of a number of third information processing devices among the plurality of information processing devices, the third information processing devices not being activated; and setting the calculated cycle, as the predetermined cycle, in at least one of the plurality of information processing devices.

* * * * *